United States Patent [19]

Tuma

[11] Patent Number: 5,293,681
[45] Date of Patent: Mar. 15, 1994

[54] ROLL-UP STRIKER PLATE FOR UNDERGROUND STORAGE TANKS

[75] Inventor: John E. Tuma, Houston, Tex.

[73] Assignee: Tanknology Corporation International, Houston, Tex.

[21] Appl. No.: 776,655

[22] Filed: Oct. 15, 1991

[51] Int. Cl.⁵ ................................................ B23P 7/00
[52] U.S. Cl. ........................................................ 29/700
[58] Field of Search ............ 29/402.01, 402.08, 402.09, 29/402.11–402.17, 225, 230, 242, 270, 700; 52/108, 588

[56] References Cited

U.S. PATENT DOCUMENTS

| | | | |
|---|---|---|---|
| 3,710,529 | 1/1973 | Pass | 52/108 X |
| 3,717,247 | 2/1973 | Moore | 52/108 X |
| 3,925,943 | 12/1975 | Petrie | 52/108 X |
| 4,027,715 | 6/1977 | Tohma | 52/108 X |
| 4,430,788 | 2/1984 | Haynes | 29/402.09 X |
| 4,671,028 | 6/1987 | Figone | 52/108 |

FOREIGN PATENT DOCUMENTS 2908290  9/1980  Fed. Rep. of Germany ........ 52/108

*Primary Examiner*—Joseph M. Gorski
*Attorney, Agent, or Firm*—Vaden, Eickenroht, Thompson, Boulware & Feather

[57] ABSTRACT

A striker plate for protecting the bottom surface of an underground storage tank from damage caused by the impact of an object thereon. The striker plate is formed by a plurality of slats having a resilient strip crossing the slats to which the slats are mounted to align the slats in side-by-side fashion and to bias the slats to a first position in which the plate is flat for application to the bottom surface of an under ground storage tank. A pivot is adapted for mounting to a setting tool so that the slats can be rolled into a cylinder for insertion through the filler pipe of the storage tank and then pivoted for application to the bottom surface of the tank and a releasable mount on the plate is provided for removing the pivot from the plate once the plate is applied to the bottom of the tank.

7 Claims, 1 Drawing Sheet

ROLL-UP STRIKER PLATE FOR UNDERGROUND STORAGE TANKS

BACKGROUND OF THE INVENTION

The present invention relates to a plate for application to a surface to be protected to which access is restricted by a relatively small opening and a method for applying a plate to a surface to which access is restricted by an opening of relatively small diameter. More particularly, the present invention relates to a striker plate for protecting the bottom of an underground storage tank (UST) from damage caused from the impact of an object thereon.

The particular application for which the present invention is intended is for use with underground storage tanks for storage of gasoline at gasoline service stations. The operators of the service station are required by federal regulation and for the purpose of inventory reconciliation to measure the depth of the gasoline in the UST at regular intervals for the purpose of calculating the volume of gasoline in the UST. To do so, the operator drops a dip stick down into the UST through the filler pipe to measure the depth of the gasoline in the UST. Most USTs installed at gasoline service stations are made of fiberglass, and the repeated dropping of the dip stick into the UST for the purpose of measuring the depth of the gasoline causes dents, cracks, and other damage to the bottom of the UST with the eventual result that the fiberglass fails and begins to leak gasoline from the tank.

Consequently, most USTs presently being installed are provided with a metal plate on the bottom of the UST beneath the filler pipe to protect against damage to the bottom of the tank from the impact of the dip stick. On information and belief, federal regulation will soon require such plates, called striker plates, in all USTs. There are, however, a large number of USTs which are presently in operation which do not have striker plates installed in them, and it is specifically for those USTs that the present invention is intended.

The currently available methods for installing striker plates in those USTs which are not provided with them involve digging down to the UST (which is usually covered with concrete), removing the gasoline stored therein, degassing the tank, cutting into and opening the top of the tank, lowering a technician down into the opened tank to install the striker plate, repairing the opening, and replacing the fill and concrete over the UST. This process is quite expensive, and takes the UST out of service for the time required for the installation. Between the cost and other disadvantages of this known process for installing striker plates and the federal regulations which will soon require their installation, there is an urgent need for an apparatus and method for installing a striker plate in those USTs which are not already provided with them. It is, therefore, a primary object of the present invention to provide such an apparatus and method.

Of course, those skilled in the art who have the benefit of this disclosure will recognize that the method and apparatus of the present invention is capable of use in applications other than the installation of a striker plate in an underground storage tank. It is, therefore, in a more general sense, an object of the present invention to provide a method and apparatus for applying a protective plate to a surface to be protected in installations in which access to the surface is restricted by a relatively small opening. Other objects, and the advantages, of the present invention will be apparent from the following description of a presently preferred embodiment thereof.

SUMMARY OF THE INVENTION

These objects are achieved in the present invention by providing a plate for application to a surface to be protected, access to that surface being restricted by a relatively small opening, comprising a plurality of side-by-side elongate members, each of the elongate members being hingedly connected to an adjacent elongate member to form, in a first position, a substantially flat plate which is rolled into a second position in which the elongate members form an elongate cylinder having a diameter of a dimension substantially smaller than the width of the plate. An elongate setting tool is provided with means for releasably mounting the elongate members to the end thereof. The plate also includes means for pivoting the elongate members from a first position in which the long axis of each of the elongate members is substantially parallel to the elongate axis of the setting tool for passing the cylinder formed by the elongate members, when rolled into the second position, through an opening restricting access to the surface to be protected and a second position in which the long axis of the cylinder is substantially perpendicular to the elongate axis of the setting tool. The plate is also provided with means for unrolling the elongate members from the second, cylindrical position to the first, flat position for application of the plate to the surface to be protected.

These objects are also achieved by providing a method for applying a plate to a surface to which access is restricted by an opening of relatively small diameter comprising the steps of rolling a plurality of hingedly connected, side-by-side elongate members into an elongate cylinder, passing the elongate cylinder through the opening restricting access to the surface to be protected by releasably mounting the elongate members to an elongate setting tool, the long axis of the cylinder being substantially parallel to the long axis of the setting tool, and inserting the setting tool through the opening. The elongate members are pivoted from the position in which the long axis of the cylinder is substantially parallel to the long axis of the setting tool to a position in which the long axis of the elongate members is substantially perpendicular to the long axis of the setting tool, the elongate members are unrolled into a plate to be applied to a surface to be protected, and then released from the setting tool, thereby applying the plate to the surface to be protected.

DETAILED DESCRIPTION OF THE PREFERRED EMBODIMENT

Figure 1:
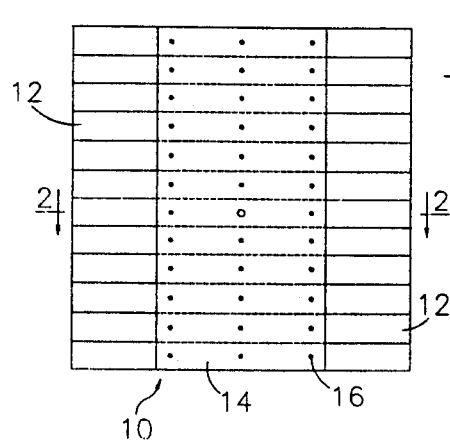
FIG. 1 is a top view of a presently preferred embodiment of a striker plate constructed in accordance with the present invention.

Referring now to the figures, there is shown a presently preferred embodiment of the striker plate of the present invention. The striker plate is comprised of a plurality of side-by-side elongate members, or slats, 12, each of the elongate members being hingedly connected to an adjacent elongate member 12 to form, in the first position shown in FIG. 1 a substantially flat plate 10. The elongate members, or slats, 12 are aligned in side-by-side fashion by mounting each slat 12 to a means for unrolling the elongate members 12 from a second cylindrical position (shown in FIG. 5) to the first, flat position for application to the surface to be protected. In the embodiment shown in FIGS. 1-7, this unrolling means takes the form of a strip of spring steel 14 to which each of the slats 12 is tack welded as at 16. Those skilled in the art who have the benefit of this disclosure will recognize that the slats 12 can also be riveted or bolted to the strip 14 and that the actual connection between the slats 12 and strip 14 is of little consequence to the manner in which invention functions to achieve its intended purpose.

Figure 3:
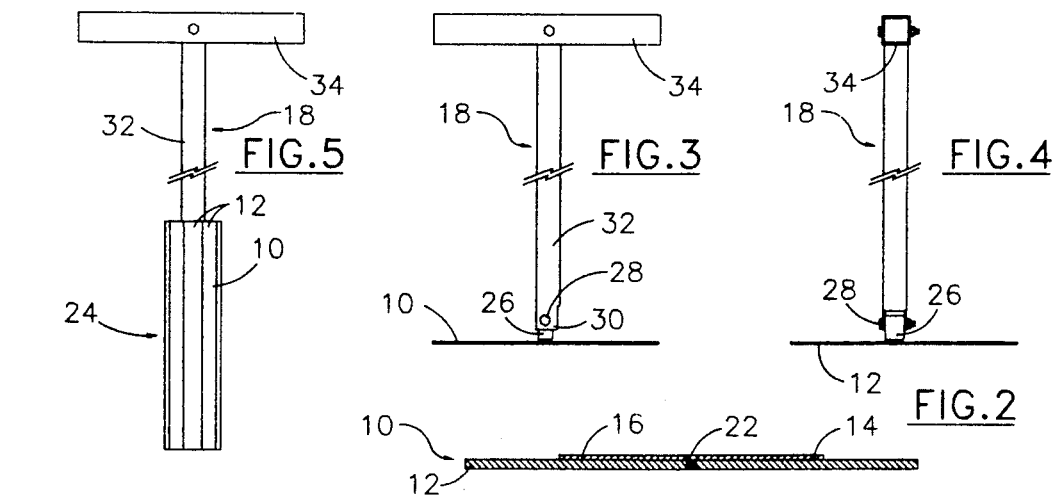
FIG. 3 is an end view of the striker plate of FIG. 1 having a setting tool constructed in accordance with the present invention releasably mounted thereto.
Figure 4:
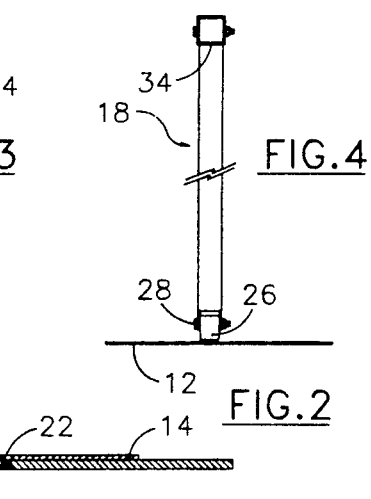
FIG. 4 is a view of the striker plate of FIG. 1 and setting tool of FIG. 3 taken at a 90° angle from FIG. 3.
Figure 2:
FIG. 2 is a sectional view of the striker plate of FIG. 1 taken at the line 2—2 in FIG. 1.

Referring now to FIGS. 3 and 4, the present invention also contemplates an elongate setting tool 18 and means, in the form of the threaded post (best shown on FIG. 7) 20, for releasably mounting the elongate members 12 comprising striker plate 10 to setting tool 18. The threaded post 20 is threadably engaged by a corresponding threaded hole 22 formed in the strip of spring steel 14 and one of the elongate members 12 as shown in FIG. 2.

Figure 5:
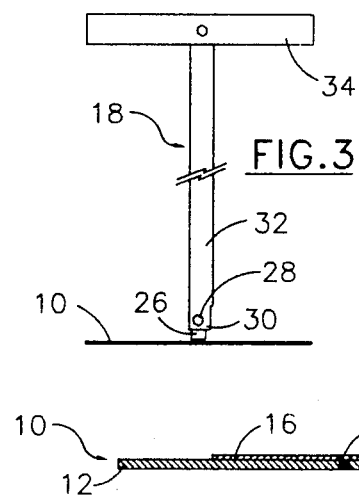
FIG. 5 is an elevational view of the striker plate and setting tool of FIGS. 3 and 4 when the striker plate is rolled into a position for inserting the striker plate through an opening limiting access to a surface to be protected.

Also provided is means for pivoting the striker plate 10 from a first position, shown in FIG. 5, in which the long axis of each of the slats 12 is substantially parallel to the elongate axis of the setting tool 18 for passing the cylinder 24 formed by the rolled up slats 12 through an opening restricting access to a surface to be protected and a second position, shown in FIGS. 3 and 4, in which the long axis of the elongate members, or slats, 12 is substantially perpendicular to the long axis of the setting tool 18. In the presently preferred embodiment of the striker plate 10 of the present invention, this pivoting means takes the form of a block 26 (best shown in FIG. 7) mounted on a bolt 28 journaled on two ears 30 formed in the end of shank 32 of setting tool 18, the threaded post 20 being mounted to the block 26. Setting tool 18 is also provided with a cross bar 34 for facilitating rotation of the setting tool 18 to back the threaded post 20 out of the threaded hole 22 in the elongate member 12 after application of the plate 10 to the surface to be protected.

Figure 6:
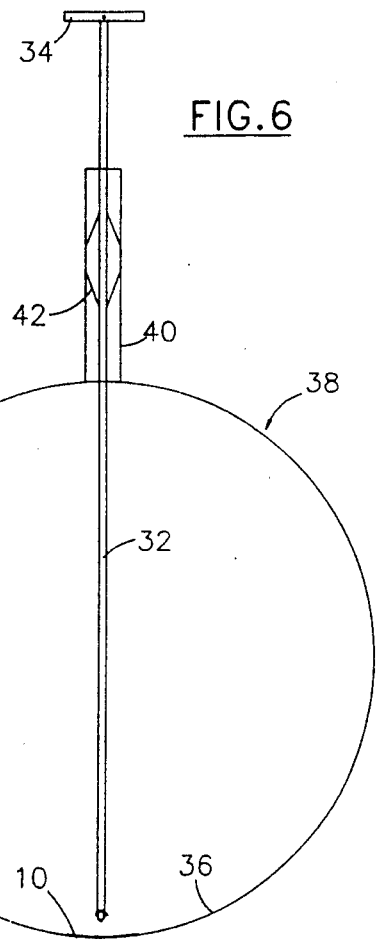
FIG. 6 is a schematic view of an underground storage tank to which the striker plate of FIG. 1 has been applied.
Figure 7:
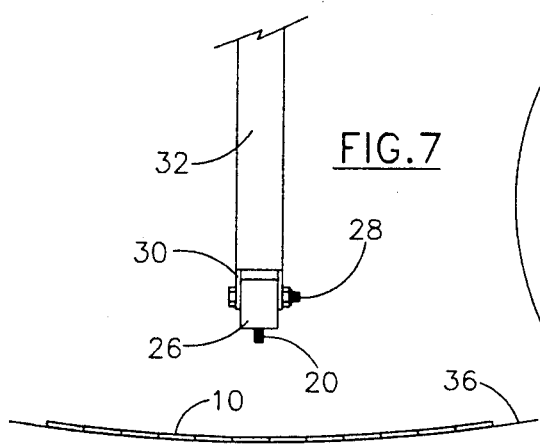
FIG. 7 is a detail view of the bottom surface of a storage tank to which the striker plate of FIG. 1 has been applied.

Referring now to FIGS. 6 and 7, the method of the present invention will now be described by reference to the above-described structure and an underground storage tank (UST) 38. In the first step of this method, the hingedly connected, side-by-side elongate members, or slats, 12 are rolled into the elongate cylinder 24 as shown in FIG. 5 for passing through the opening of the filler pipe 40 restricting access to the bottom 36 of UST 38 to be protected by releasably mounting the elongate members 12 to the elongate setting tool 18 with the long axis of the cylinder 24 formed by the rolled up elongate members 12 substantially parallel to the long axis of the shank 32 of setting tool 18. In one embodiment, the shank 32 of setting tool 18 is provided with a centralizer 42 of a construction similar to centralizers which are known and used in the oil field art for the purpose of centering the setting tool 18 in the opening of filler pipe 40 to align the plate 10 on the bottom 36 of UST 38 beneath the opening into UST 38 formed by filler pipe 40.

After the setting tool 18 having the elongate cylinder 4 mounted thereto is inserted through the opening of filler pipe 40, the elongate members 12 are pivoted from the position in which the long axis of the cylinder 24 is substantially parallel to the long axis of the shank 32 of setting tool 18 to a position in which the long axis of the elongate members 12 is substantially perpendicular to the long axis of the shank 32 of setting tool 18 as shown in FIGS. 3 and 4. It will be recognized that this pivoting occurs, once the rolled-up cylinder 24 is free of the restrictive opening of filler pipe 40, by the action of gravity on the plate 10 and the pivoting of the plate 10 on the axle formed by bolt 28. In a particularly preferred embodiment shown in FIG. 4, the hole 22 in the slat 12 comprising striker plate 10 in which post 20 is received is off-center in plate 10, e.g., is not located in the elongate member 12 which is in the center of the plate 10. By locating this hole 22 off-center in plate 10, the action of gravity on this plate 10, which causes this pivoting, is exaggerated.

The elongate members 12 comprising elongate cylinder 24 are then unrolled into the position forming striker plate 10 for application to the surface 36 to be protected and the unrolled elongate members 12 comprising striker plate 10 are then released from the setting tool 18, thereby applying the plate 10 to the surface 36 to be protected. In a preferred embodiment, the surface of the elongate members 12 which contact the bottom 36 of the UST 38, i.e., the surface of the slats 12 which is outermost when rolled into the elongate cylinder 24, is provided with an adhesive for adhering the plate 10 to the surface 36 to be protected. This adhesive is preferably an epoxy such as is available from 3-M under the trade name DP-100 Clear Scotch-Weld (3-M I.D. No. 62-3575-1435-5) which cures upon contact with gasoline, but those skilled in the art who have the benefit of this disclosure will recognize that a contact cement or any other adhesive would serve for this purpose, the criteria for selection of such an adhesive being that the adhesive is relatively chemically inert to the fluid which is stored in the UST.

Although described in terms of the above-illustrated presently preferred embodiments of the invention, it will be recognized that certain changes can be made in which the component parts thereof function to achieve their intended result. For instance, the threaded post 20 and threaded hole 22 comprising the means for releasably mounting the striker plate 10 to setting tool 18 can be replaced by, for instance, a spider (not shown) mounted to the block 26 and having a plurality of insertions on the strip 14 of spring steel. Similarly, the shank 32 of setting tool 18 can be centered in the filler pipe 40 of UST 38 by means other than centralizer 42. All such changes are intended to fall within the spirit and scope of the following claims.

What is claimed is:

1. An apparatus including a protective plate for application of the protective plate to a surface to be protected, access to that surface being restricted by a relatively small opening, comprising:

a plurality of side-by-side elongate members, each of said elongate members being hingedly connected to an adjacent elongate member to form, in a first position a substantially flat plate which is rolled into a second position in which said elongate members form an elongate cylinder having a diameter substantially smaller than the width of the plate;

an elongate setting tool having said elongate members releasably mounted thereto;

means mounted to said setting tool for allowing pivoting of said elongate members from a first position in which the long axis of each of said elongate members is substantially parallel to the long axis of said setting tool for passing the cylinder formed by said elongate members, when rolled into said second position, through an opening restricting access to a surface to be protected to a second position in which the long axis of each said elongate member is substantially perpendicular to the long axis of said setting tool; and means for unrolling said elongate members from said second, cylindrical position to said first, flat position for application of the plate to the surface to be protected.

2. The apparatus of claim 1 wherein said setting tool is mounted to said elongate members by a threaded hole formed in one of said elongate members and a threaded post integral with said means for allowing pivoting, said threaded post being received in the hole.

3. The apparatus of claim 2 wherein the threaded hole is located in one of said elongate members off-center whereby the action of gravity on the plate formed by said elongate members causes the plate formed by said elongate members to pivot from first parallel position to second perpendicular position when said setting tool is raised toward the vertical.

4. The apparatus of claim 1 wherein said means for allowing pivoting comprises a block pivotally mounted on one end of said setting tool.

5. The apparatus of claim 4 additionally comprising a post mounted to said block and means on the plate formed by said elongate members adapted for releasably receiving said post therein.

6. The apparatus of claim 1 wherein said unrolling means comprises resilient means mounted across the width of the plate formed by said elongate members for biasing said elongate members towards said first, flat position from said second, rolled position.

7. The apparatus of claim 6 wherein said elongate members are hingedly connected by mounting each of said elongate members to said resilient means.

* * * * *